W. J. DIXON.
HUB LUBRICATOR.
APPLICATION FILED JULY 31, 1913.

1,186,892.

Patented June 13, 1916.

Witnesses

W. J. Dixon,
Inventor by C. A. Snow & Co.,
Attorneys

UNITED STATES PATENT OFFICE.

WILLIAM J. DIXON, OF HOMESTEAD, PENNSYLVANIA.

HUB-LUBRICATOR.

1,186,892.　　　　　Specification of Letters Patent.　　Patented June 13, 1916.

Application filed July 31, 1913. Serial No. 782,236.

*To all whom it may concern:*

Be it known that I, WILLIAM J. DIXON, a citizen of the United States, residing at Homestead, in the county of Allegheny and State of Pennsylvania, have invented a new and useful Hub-Lubricator, of which the following is a specification.

The present invention appertains generally to vehicle wheels, and relates more particularly to lubricating means therefor.

It is the object of the present invention to provide a novel and improved means for lubricating the boxings of wheel hubs, or for lubricating other rotating or movable parts.

Another object of the present invention is to provide a device of the nature indicated which shall be comparatively simple and inexpensive in construction, as well as efficient and convenient in its use.

The present invention also comprehends the provision of a means which may be readily applied to vehicle axles now prevailing, without necessitating any appreciable expense or alterations.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The present invention has been illustrated in its preferred embodiment in the accompanying drawing, wherein:—

Figure 1:
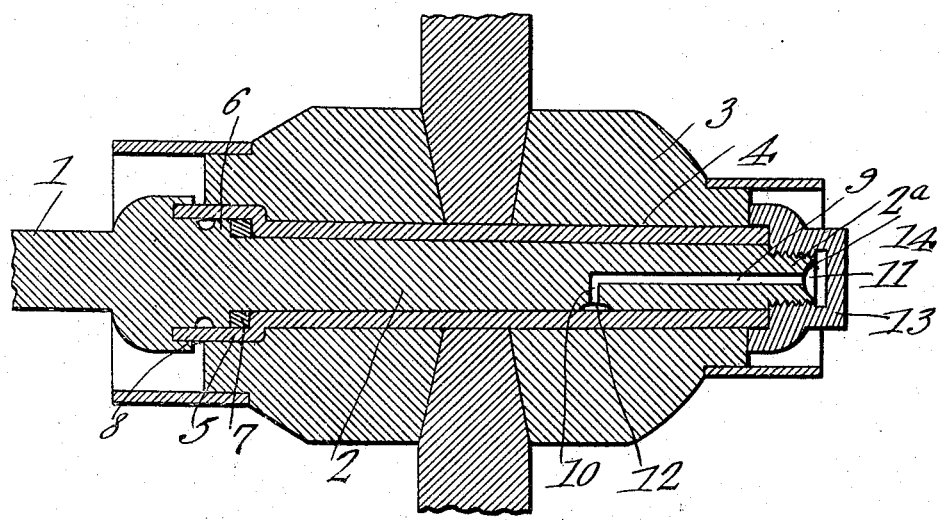
Figure 2:
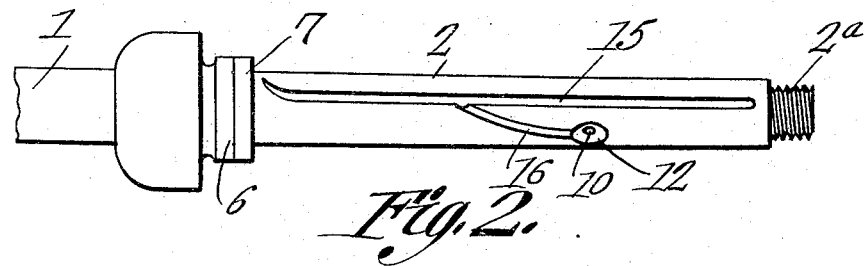

Figure 1 is a sectional view taken through a vehicle wheel hub and axle, and illustrating the axle and its nut fashioned according to the present invention. Fig. 2 is a plan view of the axle, or its spindle.

In the drawings, an ordinary vehicle axle has been designated by the numeral 1, the same being provided with the usual spindle 2 and the free end of the spindle being provided with a reduced threaded portion 2ᵃ.

The wheel hub has been designated by the numeral 3, the same being preferably of the wooden type, having the boxing 4 secured therein and rotatably mounted on the spindle 2. As illustrated, the inner end of the boxing 4 is enlarged, as at 5, so as to embrace the outer end of a collar 6 formed on the axle at the inner end of the spindle, a packing ring or compressible washer 7 being disposed between the shoulder formed by the collar 6 and the shoulder formed by the enlarged portion 5 of the boxing, so as to confine the lubricant within the boxing proper. The inner portion of the shoulder 6 is enlarged and is provided with an annular recess 8 receiving the end of the enlarged portion 5 of the boxing, in order to exclude sand, dust and other extraneous matter.

In carrying out the present invention, a lubricant duct 9 is drilled into the outer end of the spindle 2, to a point preferably short of the center of the boxing, and a lateral duct 10 is drilled into side or the bottom of the spindle 2 to the inner end of the longitudinal or axial duct 9, the ducts 9 and 10 providing an angular passage or channel leading from the outer end of the spindle to one side of the bottom thereof. The outer end of the duct 9 is preferably countersunk, as at 11, and the outer end of the branch or auxiliary duct 10 is also preferably countersunk, as at 12. There is also provided a socket or cap nut 13 adapted to be threaded on the reduced portion 2ᵃ of the spindle, so as to retain the hub in position upon the spindle. This socket nut 13 serves as a compression cup for the lubricant, and is preferably formed with a chamber 14 beyond the tap of the nut, although this is not entirely essential.

Particular attention is directed to the fact that that end of the boxing adjacent the end of the spindle projects beyond the corresponding end of the hub, and that the socket nut 13 is provided with a counter bore receiving the said end of the boxing, and forming a rim fitting snugly over and around the said end of the boxing, whereby the outer end of the boxing is prevented from vibrating upon the spindle, and whereby the lubricant is prevented from leaking outwardly from between the spindle and boxing.

As illustrated, the spindle 2 is provided with a longitudinal lubricant groove 15, the lubricant groove 15 being disposed slightly away from the inner end of the lubricant duct or channel, and a diagonal groove 16 being cut in the spindle from the countersunk portion 12, or the inner end of the duct, to the intermediate portion of the lubricant groove 16.

In practice, to lubricate the hub boxing, the socket nut 13 is removed, and is filled with grease or other lubricant, after which, the nut is again applied to the end of the spindle, which will cause the lubricant to be compressed into and through the lubricant duct to the boxing, the lubricant finding its way along the feed groove 16 to the longitudinal lubricant groove 15. In this manner, the boxing and spindle are lubricated, the lubricant gradually working to the parts which are in frictional engagement, in order that the wheel may rotate freely. One supply of lubricant will be sufficient to lubricate the boxing for an extended period of time, it being possible to replenish the supply of lubricant at such intervals as are necessary.

Attention is directed to the fact that the present invention may be incorporated in prevailing vehicle axles, in such a manner as not to involve any alterations as would prove objectionable or expensive.

The nut 13 may be of various shapes or designs, and it is evident that the same may also be employed in connection with washers, lock washers, lock nuts and the like, without detracting from the utility of the present device.

The present invention may be incorporated in bolts or other parts upon which rotary or movable parts are journaled or mounted, or in other words, the present invention is not limited to the use hereinbefore described.

Although the invention has been illustrated and described as applied to an axle spindle having a hub journaled thereon, it is to be understood that the axle spindle and hub are to be taken in their generic sense, so as to include equivalent elements. In other applications of the present invention it may be desirable or essential to omit or to alter the lubricant grooves.

Having thus described the invention, what is claimed as new is:—

In a device of the character described, a spindle having an enlarged collar at one end and a reduced threaded portion at its other end, the spindle having an axial duct opening through said portion and a lateral duct extending from the axial duct to the periphery of the spindle, the ends of said ducts being countersunk, a hub, a boxing fitted therein and journaled upon the spindle, the ends of the boxing projecting from the ends of the hub, one end of the boxing being enlarged and surrounding said collar, a packing ring upon the spindle between the shoulders formed by said collar and enlarged end of the boxing, said collar having an annular groove receiving said enlarged end of the boxing, a lubricant holding socket nut threaded upon said reduced portion and having its rim fitting snugly over and around the other end of the boxing, the spindle having a longitudinal lubricant groove terminating short of said collar and reduced portion, and a diagonal lubricant groove extending from the lateral duct to the longitudinal lubricant groove between the ends thereof.

In testimony that I claim the foregoing as my own, I have hereto affixed my signature in the presence of two witnesses.

WILLIAM J. DIXON.

Witnesses:
J. K. P. Shoemaker,
S. D. Beedle.

Copies of this patent may be obtained for five cents each, by addressing the "Commissioner of Patents, Washington, D. C."